United States Patent
Benoist et al.

(10) Patent No.: US 7,817,679 B2
(45) Date of Patent: *Oct. 19, 2010

(54) METHOD AND A SYSTEM FOR TRANSFERRING AMR SIGNALING FRAMES ON HALFRATE CHANNELS

(75) Inventors: Sebire Benoist, Beijing (CN); Thierry Bellier, Copenhagen (DK)

(73) Assignee: Nokia Corporation, Espoo (FI)

( * ) Notice: Subject to any disclaimer, the term of this patent is extended or adjusted under 35 U.S.C. 154(b) by 132 days.

This patent is subject to a terminal disclaimer.

(21) Appl. No.: 12/175,554

(22) Filed: Jul. 18, 2008

(65) Prior Publication Data

US 2008/0273625 A1 Nov. 6, 2008

Related U.S. Application Data

(63) Continuation of application No. 10/485,031, filed as application No. PCT/FI01/00749 on Aug. 27, 2001, now Pat. No. 7,415,045.

(51) Int. Cl.
*H04J 3/00* (2006.01)
(52) U.S. Cl. .................................. 370/521
(58) Field of Classification Search ............... 370/521, 370/522, 524, 252, 329, 468, 337, 347, 431, 370/330, 336, 442, 310, 345, 335, 498, 348, 370/535, 208, 537, 328; 375/259; 455/522, 455/574
See application file for complete search history.

(56) References Cited

U.S. PATENT DOCUMENTS 6,215,762 B1   4/2001   Dent 7,415,045 B2 * 8/2008 Sebire et al. ............. 370/521
2002/0133781 A1   9/2002  Mikkola et al.
2002/0164980 A1  11/2002  Eriksson et al.

FOREIGN PATENT DOCUMENTS

DE   3426568 A1   1/1986
WO   0024149 A3   4/2000

OTHER PUBLICATIONS

Honkasalo, Zhichun et al., "A Cell Range Extension Technique for GSM/DCS1800—using Half-rate Codec over Full-rate Channel". In: 1995 Fourth IEEE International Conference on Universal Personal Communications. record. Tokyo, Japan, Nov. 6-10, 1995, pp. 893-898, ISBN: 0-7803-2955-4.
International Search Report Dated Apr. 30, 2002.

* cited by examiner

*Primary Examiner*—Chi H Pham
*Assistant Examiner*—Alexander Boakye
(74) *Attorney, Agent, or Firm*—Perman & Green LLP

(57) ABSTRACT

Transference of signaling frames on GERAN (GSM/EDGE radio Access Network) half rate channels utilizing a modulation scheme carrying n bits in one symbol. In order to be able to utilize the existing channel coding developed for channels with different modulations and to avoid high rate convolutional and block codes, the AMR signaling frame to be transferred is coded using a coding procedure defined for a GSM half rate channel utilizing a GMSK modulation scheme, the coding procedure outputting a coded output stream. In response to said coding, each bit of the coded output stream is repeated n times, whereby a repeated bit stream is obtained, and symbols to be transmitted are formed from the repeated bit stream.

30 Claims, 3 Drawing Sheets

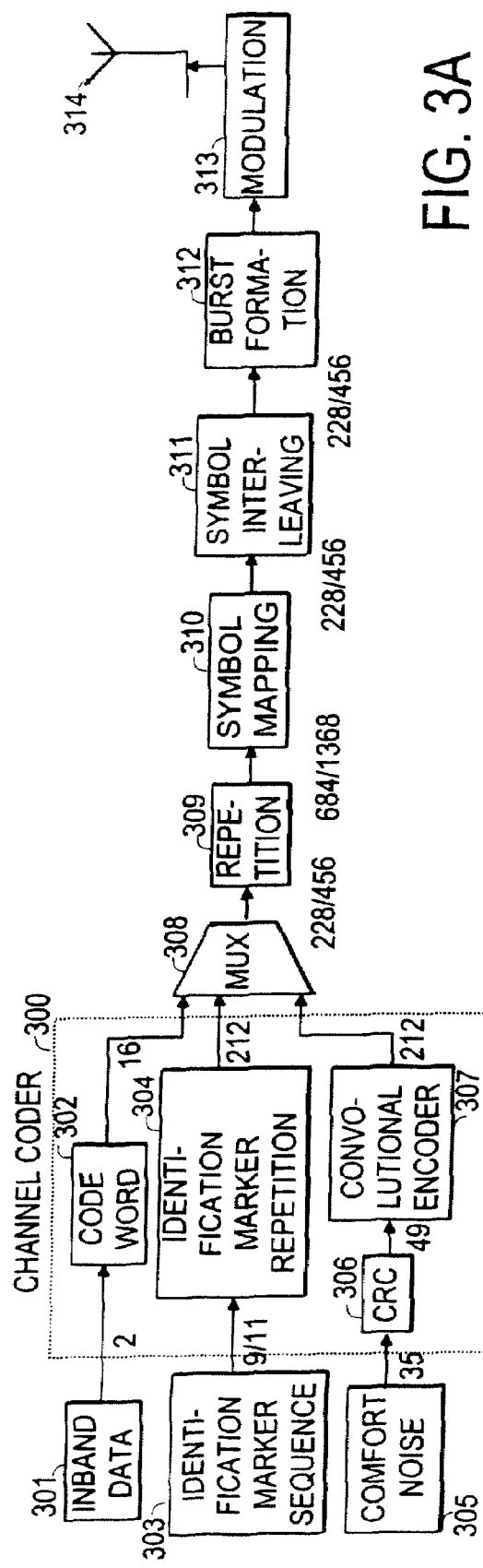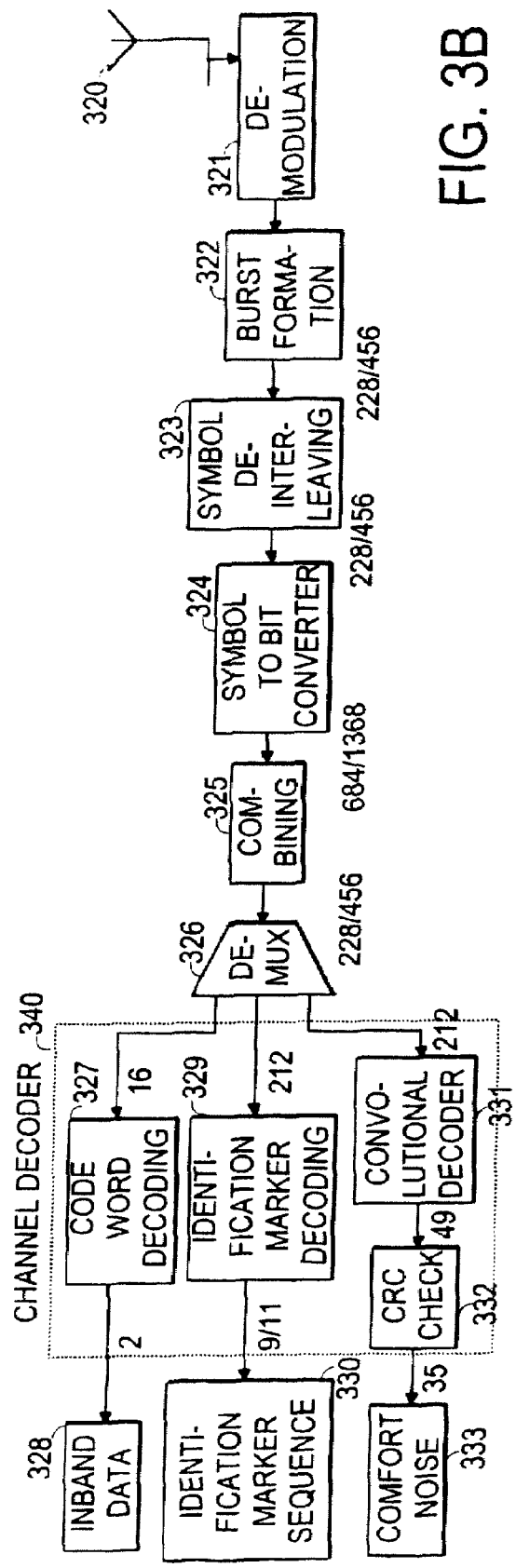

METHOD AND A SYSTEM FOR TRANSFERRING AMR SIGNALING FRAMES ON HALFRATE CHANNELS

CROSS REFERENCE TO RELATED APPLICATION(S)

This application is a continuation of, and claims the benefit of and priority to, U.S. patent application Ser. No. 10/485,031, filed on Jul. 19, 2004, now allowed, which claims priority to International Application No. PCT/FI01/00749, International Filing date, Aug. 27, 2001, which designated the United States of America, and which international application was published under PCT Article 21(2) as WO Publication No. WO 03019847 A, all of which are incorporated by reference herein in their entirety.

FIELD

The disclosed embodiments relate generally to the transmission of signaling information. More specifically, The disclosed embodiments relate to the transference of signaling frames on GERAN (GSM/EDGE Radio Access Network) half rate channels utilizing a modulation scheme.

BACKGROUND

Recent development in mobile communications technologies has been towards increased bandwidths and faster data rates. The GSM (Global System for Mobile Communications) has been one of the most successful communications technologies ever. However, as the relatively slow transmission speed of GSM has been a bottleneck for creating better services to the consumer market, a lot of effort has been put into developing new faster technologies for mobile communications. One such example is EDGE (Enhanced Data rates GSM Evolution). The standardization of EDGE was completed at the European Telecommunications Standards Institute in 1997.

For GSM/EDGE Radio Access Network (GERAN), there have been several new challenges to overcome. Higher data rates are achieved in part by changing channel coding. The transmission in a TDMA (Time Division Multiple Access) system takes place in time frames. Each frame can be shared among users by dividing the frame into time slots. A TDMA time frame thus comprises physical channels used to physically transfer information from one place to another. The contents of the physical channels form logical channels, which can be divided into traffic and control channels. The control channels can be further divided into dedicated and common channels. The dedicated channels are used for traffic and signaling between the network and the Mobile Stations (MS), whereas the common channels are used for broadcasting different information to the MS and for setting up signaling channels between the Mobile Switching Center/Visitor Location Register (MSC/VLR) and the MSs. Over the radio path, different types of signaling channels are used to facilitate the discussions between the MSs and the Base Transceiver Stations (BTSs), Base Station Controllers (BSCs), and the MSC/VLR. The logical channels are mapped onto physical channels as described in the technical specification 3GPP TS 45.002 (GERAN Multiplexing and multiple access on the radio path).

In the GSM system, the modulation method used is a phase modulation known as Gaussian Minimum Shift Keying (GMSK). In GMSK, the phase of a true bit is shifted 90°, whereas the phase of a false bit is not shifted. With the increasing data rates of EDGE, new 8 Phase Shift Keying (8-PSK) with 8 possible shift values has been introduced (3GPP TS 45.004). Each of the shift values corresponds to a certain symbol consisting of 3 bits.

The two types of speech traffic channels used in the GSM are the Full Rate GMSK Traffic Channel (TCH/F) and the Half Rate GMSK Traffic Channel (TCH/H). For the TCH/F channels, the voice codecs normally used are the Full Rate (FR) and the Enhanced Full Rate (EFR) codecs. The EFR speech coder provides the best quality of voice. For the TCH/H channels a Half Rate (HR) coder is normally used, which consumes less bandwidth as compared to the FR codecs. The HR coder can therefore be used to serve a double number of subscribers on a half rate speech traffic channel as compared to an FR coder on a full-rate speech traffic channel.

In order to achieve a better voice quality, a new Adaptive Multi-Rate (AMR) coder has been introduced (Release 1998). Further, the introduction of AMR on TCH/H channels utilizing 8-PSK (O-TCH/H channels) has been considered. However, there has not been any channel coding for the AMR signaling frames defined for such traffic channels (O-TCH/H). The AMR signaling frames are listed in Table 1.

TABLE 1

The different AMR signaling frames used on half rate channels.

| AMR Signaling Frame | Purpose |
| --- | --- |
| SID_FIRST_P1 | indicates end of speech, start of DTX ($1^{st}$ part) |
| SID_FIRST_P2 | indicates end of speech, start of DTX ($2^{nd}$ part) |
| SID_FIRST_INH | inhibits the second part of a SID_FIRST_P1 if a speech onset occurs |
| ONSET | tells the codec the mode of the first speech frame after DTX |
| SID_UPDATE | conveys comfort noise parameters during DTX |
| SID_UPDATE_INH | inhibits the second part of a SID_UPDATE frame if a speech onset occurs |
| RATSCCH_MARKER | identifies RATSSCH frames |
| RATSCCH_DATA | conveys the actual RATSSCH message |

It is not possible to use GMSK for the AMR signaling frames and 8-PSK for the traffic at the same time, because some of the signaling frames, such as for the ONSET signaling messages, share the same bursts as the speech.

As the same AMR signaling frames are needed for the new half rate channels using 8-PSK modulation (O-TCH/H), a new channel coding for these frames has to be introduced. A straightforward solution to this problem is now discussed with reference to FIG. 1. The numbers under the data flow arrows in the figure denote the number of bits included in a bit block used in the system. The reader is kindly referred to the document 3GPP TS 45.003 V5.1.0 (GSM/EDGE Radio Access Network; Channel Coding) and to the references therein about the different messages referenced below.

A crucial part of the system is the Channel Coder 100 in FIG. 1A. Usually a block to be transmitted includes Inband Data 101 consisting of two bits. These bits are coded in a coding block 102 using predefined code words, which must be 48 bits in length in order to correspond to the reserved block length. Occasionally, the bits to be transmitted further include Identification Marker Sequences 103 consisting of 9- or 11-bit sequence. Eleven bits are used for the RATSSCH_MARKER, for which a repetition of 58 times in the repetition block 104 is required to get the correct total block length of 636 bits. For the other AMR signaling frames a repetition of 71 times is required in the repetition block 104. For the AMR signaling frames SID_UPDATE, which convey Comfort Noise parameters during a Discontinuous Transmission (DTX) period, and for the RATSCCH_DATA AMR signaling frame the Comfort Noise parameters 105 also need to be coded. A Cyclic Redundancy Check (CRC) is performed in the check block 106 to protect the Comfort Noise against transmission errors. This checksum (14 bits) is added to the Comfort Noise parameters (49 bits total), and the result is fed through a convolutional encoder block 107, which increases the block length to 636 bits.

All signals coming from the Channel Coder 100 are multiplexed in a multiplexing block 108. The total number of bits to be sent in a block is either 684 bits or 1368, depending on the AMR signaling frame. The AMR signaling frames are mapped in the mapping block 109 to 8-PSK symbols, which modifies the block size to 228 or 456 symbols. The symbols resulting from the signaling frames are then interleaved in the interleaving block 110 together with blocks from other frames, which may be speech frames, for example. After the interleaving a burst will be formatted in the burst formation block 111. Then the burst is modulated in a modulation block 112 and directed to the transmission block 113.

In FIG. 1B, after receiving a signal in a receiving block 129, the signal must be demodulated in the demodulation block 130. The content of the original burst has to be recovered in the recovery block 131. Because the burst consists of interleaved symbols, they must first be fed through the deinterleaving block 132 and then converted back to bits in the converting block 133. Before the messages can be passed to the Channel Decoder 120, the signaling must be de-multiplexed in the de-multiplexing block 134 so that the Inband Data part 136 is decoded in the codeword decoder block 135, and the Identification Marker Sequence 138 in the Identification Marker decoder block 137. If the AMR signaling frame includes Comfort Noise parameters, they are then decoded in the corresponding decoding block 139, and the CRC bits are verified in the verification block 140. Only after this are the Comfort Noise parameters 141 obtained.

The drawback of the solution described above is that both high rate convolutional codes and high rate block codes are required. The convolutional coder 107 encodes the 49 bits sequence into 636 bits, and the block coder 102 encodes the 2 bits into 48 bits. In the reverse direction, the convolutional decoder 139 decodes the 636 bits into the 49 bits, and the code word decoder 135 decodes the 48 bits into the 2 bits. These so-called fast-rate conversions are not desirable, as they increase the development cost and demand larger coding tables in the network elements and terminals. They are also computationally heavy and consume a lot of memory.

The rate of the convolutional encoder 107 for the Comfort Noise is $\frac{1}{12}$, which is more demanding than the $\frac{1}{4}$ for the GMSK. The constraint length can also be increased from k5 to .k7, as is done for speech, and the existing polynomials G4-G7 can be used. The interested reader may find descriptions of the polynomials and the constraint lengths in the document 3GPP TS 45.003 V5.1.0 (GERAN Channel Coding). As explained above, the shorter 9 bit sequence of the identification marker has to be repeated 71 times.

The purpose of The disclosed embodiments is to address the problem discussed above. This can be achieved using a method and system for processing AMR signaling frames as described in the independent claims.

SUMMARY

In order to be able to utilize the existing channel coding developed for channels with different modulations and to avoid high rate convolutional and block codes, the channel coding has to be performed in a novel way for channels that use a modulation scheme carrying several bits in one symbol. The disclosed embodiments provides such a novel mechanism, particularly for traffic channels utilizing the 8-PSK modulation method referred to above. Using a modulation scheme carrying several bits in one symbol, n bits can be represented with one symbol if there are $2^n$ possible modulation states.

The idea of the disclosed embodiments is that by using bit repetition the current channel encoders and interleavers defined for the use of corresponding GMSK channels can be utilized when transmitting AMR signaling frames on the GERAN half rate channels utilizing 8-PSK.

Thus, a coding procedure identical to the one already standardized for the GMSK channels can be used for the AMR signaling frames. In the method of the invention, in each block of m bits coded by means of said standardized coding process, each bit c(i) is first repeated 3 times $\{c'(3(i-1)+1), c'(3(i-1)+2), c'(3(i-1)+3)\}$. These 3 bits are then converted into one symbol C(i). After converting all m signaling bits, the resulting symbols C(1), . . . , C(m) are interleaved. After interleaving, the symbols are modulated and then transmitted.

In the receiver, the signal has to be demodulated. The received symbols $\{C(1), C(2), C(3)\}$ are then de-interleaved, after which the symbol C(i) is converted into 3 bits $\{c'(3(i-1)+1), c'(3(i-1)+2)), c'(3(i-1)+3)\}$. The 3-multiple bit sequence has to be converted back to the original bit c(i). The soft value of c(i) can be computed by combining the soft values of the 3-multiple bit sequence received.

BRIEF DESCRIPTION OF THE DRAWINGS

FIGS. 3A and 3B illustrate the system of the invention.

DETAILED DESCRIPTION OF THE DISCLOSED EMBODIMENTS

Figure 1A:
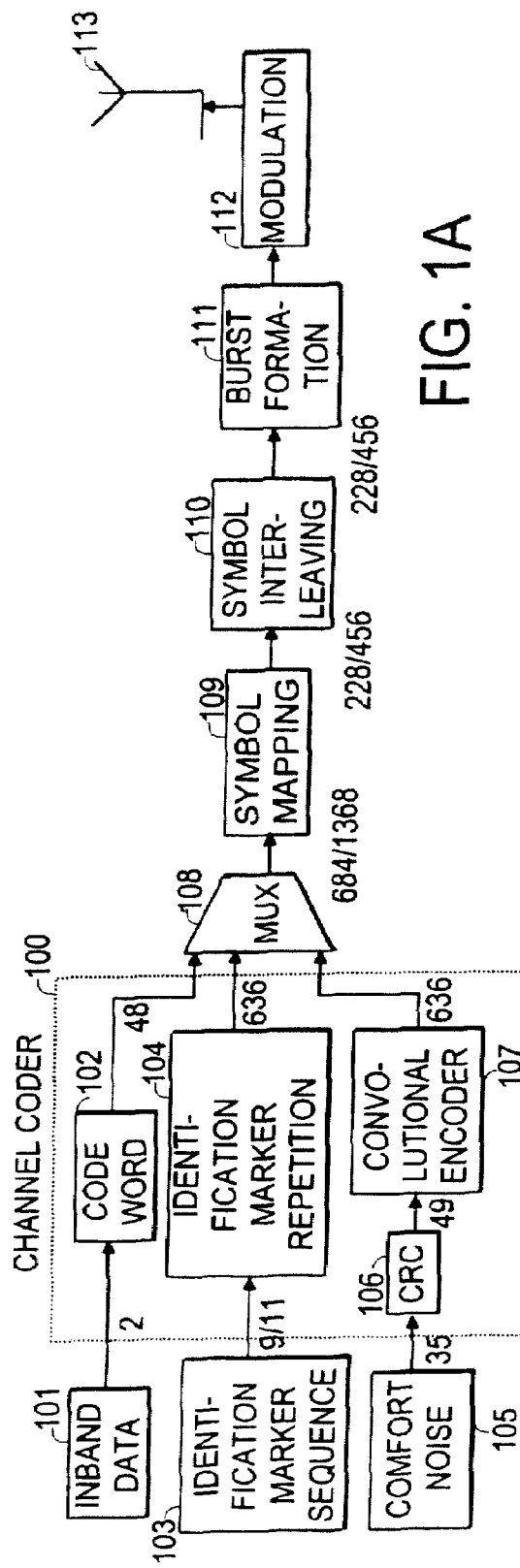
FIGS. 1A and 1B show a straightforward solution for transferring AMR signaling frames on a GERAN half rate channel.
Figure 1B:
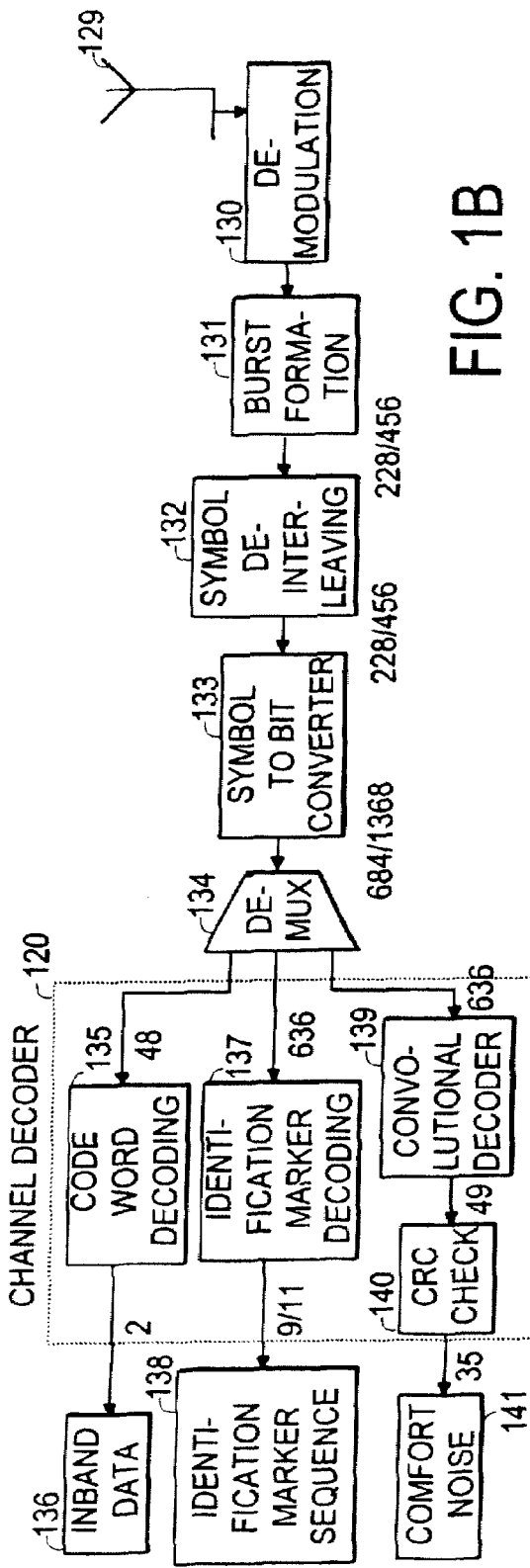
Figure 2A:
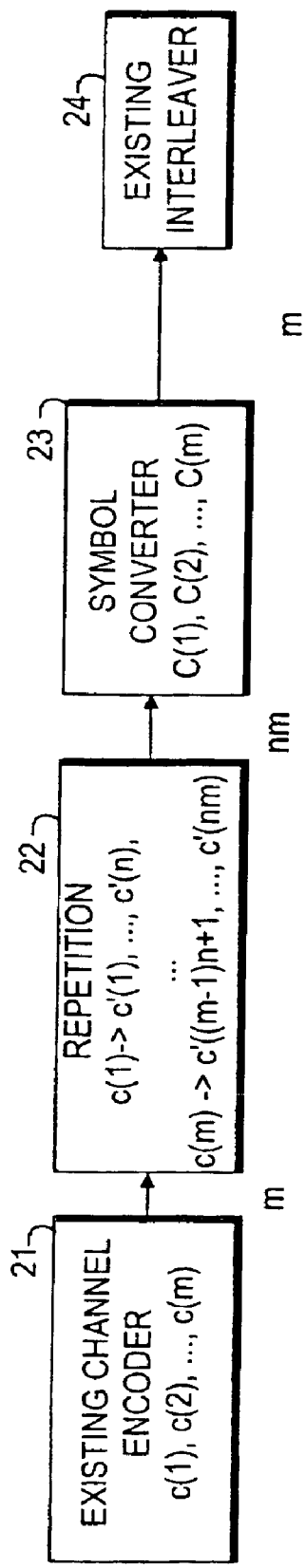
FIGS. 2A and 2B illustrate the method of the invention.

FIG. 2A illustrates the transmission side of the system of the invention. Each bit c(i) transmitted from the existing channel encoder block 21, which is defined for the corresponding GMSK channel, is repeated in a repetition block 22 n times to correspond to the number of bits carried by one symbol. The value of n depends on the keying algorithm used; for the 8-PSK n=3. The n bits $\{c'((i-1)n+1), \ldots, C'((i-1)n+n)\}$ generated on the basis of c(i) are then converted to a symbol C(i) in a conversion block 23. The symbols are then interleaved using an interleaver 24, which is also already defined for the corresponding GMSK channel. It is important not to map one bit directly onto one symbol but to repeat them first, as, depending on the modulation, every time a bit is marked on a symbol there may be a rotation on the constellation. For example, the 8-PSK symbols are continuously rotated with $3\pi/8$ radians per symbol before pulse shaping.

Figure 2B:
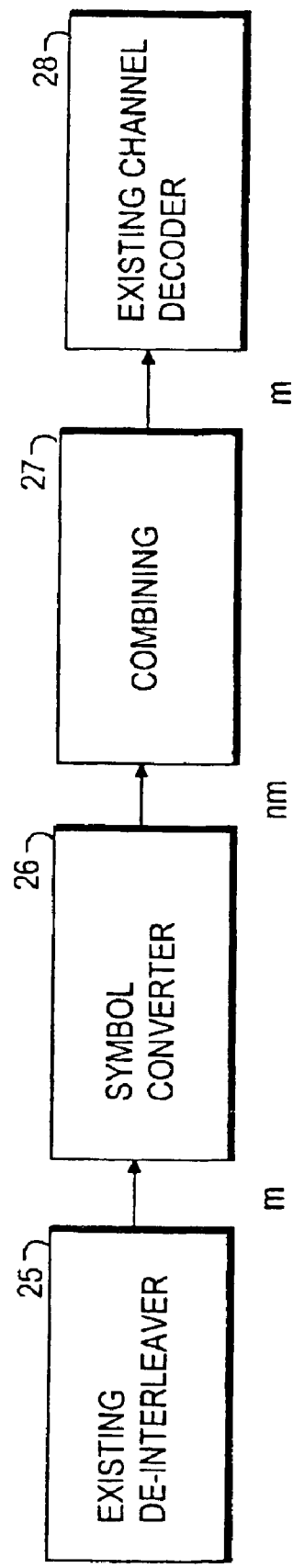

The receiving side of the system, as seen from FIG. 2B, is the reverse of the sending side. The received symbols C(i) have to be de25 interleaved using a known de-interleaver 25 defined for the corresponding GMSK channel. After this, the n bit sequence $\{c'((i-1)n+1)_1 \ldots, c'((i-1)n+n)\}$ is obtained using the normal symbol to bit conversion in the conversion block 26. The n bit sequence is combined in a combination block 27 to form a bit value corresponding to the original bit value c(i). Preferably, this is done by combining the soft values of the received n-multiple bit sequence. In this way the bit sequence is reduced to one bit, which is ready to be fed into the channel decoder 28. The channel decoder 28 is substantially the same as the one defined for the corresponding GMSK channel.

In the following, the application of the invention on the AMR signaling frames of an 8-PSK modulated HR AMR Speech Traffic Channel (0-TCH/AHS) is described. On the transmission side (FIG. 3A), the inband Data 301 to be transmitted is encoded in the coder block 302 of the channel coder part 300. The identification Marker sequence 303 is repeated in the repeating block 304. Also for the Comfort Noise 305, if included in the signaling frame, a CRC is calculated in the calculation block 306 and then the resulting bit 5 sequence is convolutionally encoded in the corresponding coding block 307.

Blocks 304, 306, and 307 are identical to the respective blocks already standardized for the corresponding GMSK channel (see 3GPP TS 45.003 GE-RAN Channel Coding).

Thanks to the solution according to the invention, the code words block 302 can be selected to correspond to the already existing TCH/AHS 16 bit code words, for example. Consequently, the tables in the Channel Coder 300 need not include longer high-rate codes, thus saving memory. Another benefit of the invention is that if already existing code words are selected, there are only minor changes required in the network elements and in the terminal equipment. The 9-bit sequence of the Identification Marker 303 need not be repeated 71 times but 24 times, and for the AMR signaling frame RATSCCH the 11-bit sequence of the Identification Marker 303 needs to be repeated only 20 times. After the repetition in the repetition block 304, the Identification Marker block consists of 212 bits. The Comfort Noise parameters 305 can be convolutionally encoded in the coder block 307 with a shorter code, which results in 212 bits. This is computationally cheaper, and, also saves memory. As the convolutional encoder block 307 and the encoder block 302 are identical to the ones already standardized for the corresponding GMSK channels, the rate of the convolutional encoder will constraint length value k=5 and, similarly, the already existing polynomials G1, G2, and G3 can be used.

The multiplexing block 308 functions similarly to the solution described above. In the repetition part 309, when the invention is applied to 0-TCH/H, the available bandwidth for the AMR signaling frames is threefold (stretched from 228 bits to 684 bits, or from 456 bits to 1368 bits). Each bit is therefore repeated three times: a bit c(i) will be mapped to a bit triplet {c'(3(i−1)+1), c'(3(i−1)+2), c'(3(i−1)+3)}. The repeating ensures a correct block length for the AMR signaling frames. When all bits have been repeated, the bit triplets are mapped in a mapping block 310 to 8-PSK symbols C(i) according to Table 1 in 3GPP TS 45.004 (GERAN Modulation).

The symbols are then interleaved in the interleaving block 311 together with other symbols, and then a burst is formatted in the formation block 312. The bursts are transmitted by the transmission block 314 after modulation in the modulation block 313.

In the receiving part (FIG. 3B) the received signal 320 is first demodulated in a demodulating block 321. The content of the original burst is recovered in the recovery block 322 and dc-interleaved in the dc-interleaving block 323. At this stage the signals are symbols C(i), which need to be converted back to bit triplets {c'(3(i−1)+1), c'(3(i−1)+2), c'(3(i−1)+3)}. The conversion is performed using the ordinary 8-PSK conversion table. The triplet has to be combined in the combining block 325 to correspond to one bit. The probable soft value of c(i) can be decided, for example, by combining the soft values of the received bit triplet, for instance c(i)=0.4*c'(3(i−1)+1)+0.4*c'(3(i−1)+2)+0.2*c'(3(i−1)+3).

The combined soft values c(i) of the bits are then dc-multiplexed in the dc-multiplexing block 326, before the channel decoder 340 processes them. The Inband Data 328 is then decoded in the decoding block 327 using the code word table, whereas the Identification Marker sequence 330 is decoded in the Identification Marker decoding part 212. If present, the Comfort Noise 333 is obtained after convolutionally decoding the bit sequence coming from the demultiplexer 326 in the decoding block 331 and CRC checking them in the checking block 332. Again, the decoder 340 and de-interleaver block 323 are the same as those used for the TCH/AHS traffic channels.

Although the embodiments were described above with reference to the examples shown in the appended drawings, it is obvious that the invention is not limited to these, but may be modified by those skilled in the art without departing from the scope and spirit of the invention For example, another suitable modulation scheme, such as 16-PSK, can be selected to implement the invention.

The invention claimed is:

1. An apparatus comprising:
    an encoder configured to output a coded bit stream encoded according to a procedure defined for a global system for mobile communications half rate channel utilizing a gaussian minimum shift keying modulation scheme;
    a repeater configured to be responsive to the encoder and to repeat each bit of the coded bit stream at least two times to generate a repeated bit stream;
    a symbol-former configured to be responsive to said repeater to form symbols to be transmitted from said repeated bit stream, each symbol carrying at least two bits; and
    a transmitter configured to transmit the symbols as an adaptive multi-rate signaling frame for a half rate channel.

2. An apparatus according to claim 1, wherein the repeater is configured to repeat each bit 3 times.

3. An apparatus according to claim 2, wherein the symbol-former is configured to convert the 3 bits into one symbol.

4. An apparatus according to claim 1, further comprising an interleaver configured to interleave the symbols.

5. An apparatus according to claim 1, further comprising a modulator configured to modulate the symbols.

6. An apparatus comprising:
    a receiver configured to receive an adaptive multi-rate signaling frame comprising a symbol stream on a half rate channel, each symbol carrying at least two bits;
    a converter configured to convert the received symbol stream to a first bit stream,
    a processor configured to segment the first bit stream into successive blocks, each block consisting of at least two bits, and convert each block into one bit to generate a second bit stream, and
    a decoder configured to decode said second bit stream according to a procedure defined for a global system for mobile communications half rate channel utilizing a gaussian minimum shift keying modulation scheme.

7. An apparatus according to claim 6, wherein the converter is configured to convert each symbol into 3 bits.

8. An apparatus according to claim 7, wherein the processor is configured to combine the 3 bits into 1 bit.

9. An apparatus according to claim 6, further comprising a demodulator configured to demodulate the symbols.

10. An apparatus according to claim 6, further comprising a de-interleaver configured to de-interleave the symbols.

11. A method comprising:
coding an adaptive multi-rate signaling frame using a coding procedure defined for a global system for mobile communications half rate channel utilizing a gaussian minimum shift keying modulation scheme, the coding procedure outputting a coded output stream;
repeating, in response to said coding, each bit of the coded output stream at least two times to generate a repeated bit stream;
forming symbols to be transmitted from the repeated bit stream, each symbol carrying at least two bits; and
transmitting the symbols as an adaptive multi-rate signaling frame for a half rate channel.

12. A method according to claim 11, wherein each bit is repeated 3 times.

13. A method according to claim 12, wherein the 3 bits are converted into one symbol.

14. A method according to claim 11, further comprising interleaving the symbols.

15. A method according to claim 11, further comprising modulating the symbols.

16. A method comprising:
receive an adaptive multi-rate signaling frame comprising a symbol stream on a half rate channel, each symbol carrying at least two bits;
converting the received symbol stream into a first bit stream;
segmenting said first bit stream into successive blocks, each block consisting of at least two bits;
converting each block into one bit to generate a second bit stream; and
decoding said second bit stream using a coding procedure defined for a global system for mobile communications half rate channel utilizing a gaussian minimum shift keying modulation scheme.

17. A method according to claim 16, wherein each symbol is converted into 3 bits.

18. A method according to claim 17, wherein the 3 bits are converted into 1 bit.

19. A method according to claim 16, further comprising demodulating the symbols.

20. A method according to claim 16, further comprising de-interleaving the symbols.

21. A computer program embodied on a non-transitory computer-readable medium, the computer program configured to control a processor to perform operations comprising:
coding an adaptive multi-rate signaling frame using a coding procedure defined for a global system for mobile communications half rate channel utilizing a gaussian minimum shift keying modulation scheme, the coding procedure outputting a coded output stream;
repeating, in response to said coding, each bit of the coded output stream at least two times to generate a repeated bit stream;
forming symbols to be transmitted from the repeated bit stream, each symbol carrying at least two bits; and
transmitting the symbols as an adaptive multi-rate signaling frame for a half rate channel.

22. A computer program embodied on a non-transitory computer-readable medium according to claim 21, wherein each bit is repeated 3 times.

23. A computer program embodied on a non-transitory computer-readable medium according to claim 22, wherein the 3 bits are converted into one symbol.

24. A computer program embodied on a non-transitory computer-readable medium according to claim 21, further comprising interleaving the symbols.

25. A computer program embodied on a non-transitory computer-readable medium according to claim 21, further comprising modulating the symbols.

26. A computer program embodied on a non-transitory computer-readable medium, the computer program configured to control a processor to perform operations comprising:
receive an adaptive multi-rate signaling frame comprising a symbol stream on a half rate channel, each symbol carrying at least two bits;
converting the received symbol stream into a first bit stream;
segmenting said first bit stream into successive blocks, each block consisting of at least two bits;
converting each block into one bit to generate a second bit stream; and
decoding said second bit stream using a coding procedure defined for a global system for mobile communications half rate channel utilizing a gaussian minimum shift keying modulation scheme.

27. A computer program embodied on a non-transitory computer-readable medium according to claim 26, wherein each symbol is converted into 3 bits.

28. A computer program embodied on a non-transitory computer-readable medium according to claim 27, wherein the 3 bits are converted into 1 bit.

29. A computer program embodied on a non-transitory computer-readable medium according to claim 26, further comprising demodulating the symbols.

30. A computer program embodied on a non-transitory computer-readable medium according to claim 26, further comprising de-interleaving the symbols.

* * * * *

UNITED STATES PATENT AND TRADEMARK OFFICE
CERTIFICATE OF CORRECTION

PATENT NO.         : 7,817,679 B2                                Page 1 of 1
APPLICATION NO.    : 12/175554
DATED              : October 19, 2010
INVENTOR(S)        : Sebire et al.

It is certified that error appears in the above-identified patent and that said Letters Patent is hereby corrected as shown below:

First Page, Col. 1, Inventors (75), delete Sebire Benoist, and insert -- Benoist SEBIRE, --, therefor.

Signed and Sealed this
Twenty-seventh Day of March, 2012

David J. Kappos
*Director of the United States Patent and Trademark Office*